United States Patent

[11] 3,594,105

| [72] | Inventor | Eugene Richardson |
| | | Southfield, Mich. |
| [21] | Appl. No. | 835,480 |
| [22] | Filed | June 23, 1969 |
| [45] | Patented | July 20, 1971 |
| [73] | Assignee | Lamina, Inc. |
| | | Oak Park, Mich. |

[54] REVERSIBLE, VARIABLE SPEED, ROTARY CASING, ORBITAL GEAR ROTOR MOTOR
10 Claims, 12 Drawing Figs.

[52] U.S. Cl. .................................................. 418/61,
418/166
[51] Int. Cl. .................................................. F04c 1/02
[50] Field of Search ........................................... 91/56;
103/117, 130, 131; 230/145, 146; 123/8; 418/61, 166

[56] References Cited
UNITED STATES PATENTS
3,118,387   1/1964   Aldrich .......................... 103/117 UX
3,273,501   9/1966   Tothero ............................. 418/166

*Primary Examiner*—Houston S. Bell, Jr.
*Attorney*—Barthel and Bugbee

ABSTRACT: Axially spaced coaxial fluid inlet and outlet shafts are nonrotatably fixed to a supporting frame and have longitudinal fluid inlet and outlet passageways with transverse ports which communicate with cruciform transverse valve ports in inlet and outlet valve sleeves rotatably mounted on the inlet and outlet shafts with their corresponding ports rotated out of phase relatively to one another. Hubs secured to these inlet and outlet valve sleeves are mechanically connected to one another and to a control knob for rotation simultaneously relatively to one another in opposite directions from an aligned central neutral position to produce forward or reverse rotation of the casing. The inner ends of the shaft are provided with enlarged internally splined heads coupled to an externally toothed internally splined inner stator by a pair of double-headed externally splined drive links which switch, with the stator, oscillate but do not rotate. The rotary casing includes an internally toothed outer rotor meshing with the inner stator on an axis eccentric thereto and, axially spaced fluid input and output barrels bolted thereto and provided with longitudinal fluid passageways which connect the valve sleeve ports with the spaces between the rotor and stator teeth. In operation, hydraulic pressure fluid flows through the inlet shaft and valve sleeve ports and input barrel passageways into the spaces between the rotor and stator teeth, rotating the rotor. Fluid is then discharged through the passageways and ports of the barrel, output valve sleeve and output shaft.

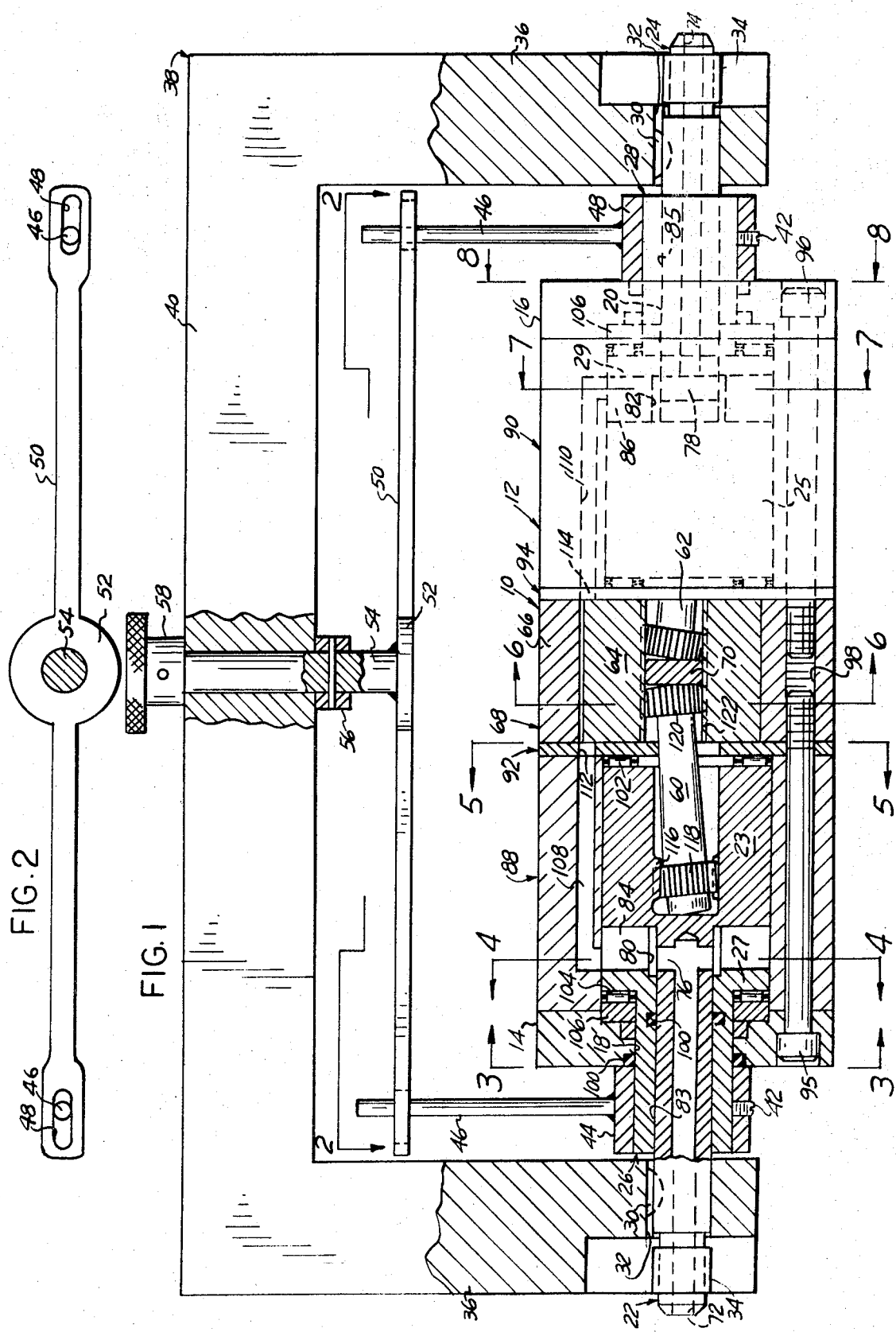

PATENTED JUL 20 1971 3,594,105

REVERSIBLE, VARIABLE SPEED, ROTARY CASING, ORBITAL GEAR ROTOR MOTOR

In the drawings:

FIG. 1 is a side elevation, partly in longitudinal section, of a reversible, variable speed, rotary casing, orbital gear rotor motor, according to one form of the invention, with the working parts shown in their neutral positions;

FIG. 2 is a top plan view, partly in section, of the connecting bar and control shaft for linking and oppositely rotating valve sleeves of the motor of FIG. 1, looking in the direction of the arrows 2-2 therein;

Figure 7:
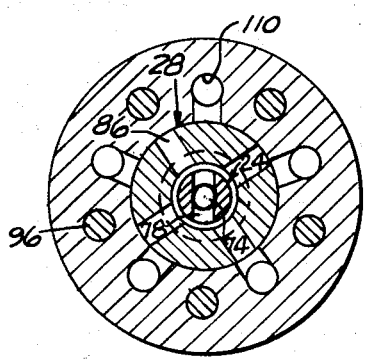
Figure 8:
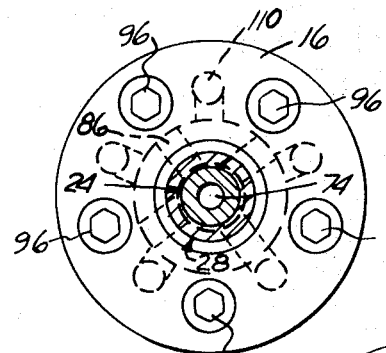
Figure 9:
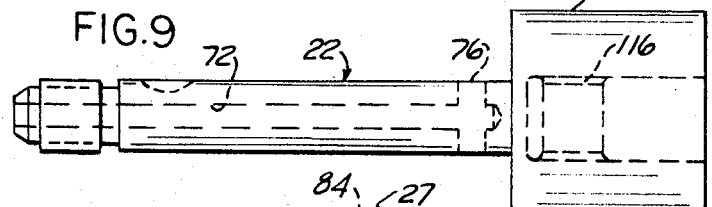
Figure 10:
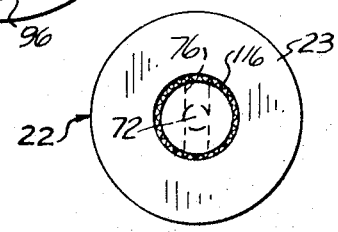
Figure 11:
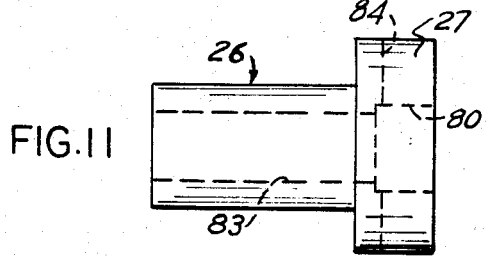
Figure 12:
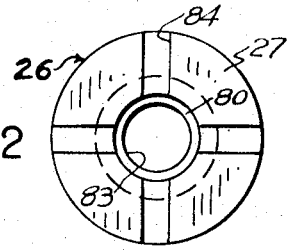

FIGS. 3 to 6 inclusive are cross sections, upon a slightly reduced scale, through the motor of FIG. 1, taken respectively along the lines 3-3, 4-4, 4-5 and 6-6, with the working parts also shown in their neutral or inoperative positions;

FIGS. 7 and 8 are cross sections, also upon a slightly reduced scale, taken along the lines 7-7 and 8-8 respectively in FIG. 1, but with the working parts shown in their operative, power-generating positions;

FIG. 9 is a side elevation of one of the stationary fluid shafts, the other shaft being a duplicate thereof;

FIG. 10 is a right-hand end elevation of the shaft shown in FIG. 9;

FIG. 11 is a side elevation of the inlet valve sleeve associated with the shaft of FIG. 9, the outlet valve sleeve being a duplicate thereof; and FIG. 12 is a right-hand end elevation of the valve sleeve shown in FIG. 11.

Referring to the drawings in detail, FIG. 1 shows a reversible, variable speed, orbital, rotary casing, gear rotor motor, generally designated 10, according to one form of the invention as consisting generally of an elongated approximately cylindrical composite rotary casing 12 including at its opposite ends inlet and outlet end plates 14 and 16 respectively bored at 18 and 20 to receive stationary hollow fluid inlet and outlet shafts 22 and 24 with enlarged heads 23 and 25 respectively and telescoping inlet and outlet valve sleeves 26 and 28 also with enlarged heads 27 and 29 respectively. The inlet and outlet shafts 22 and 24 are fixedly secured against rotation, by keys 30 in keyways 32 in coaxial bores 34 formed in the arms 36 of a supporting frame structure 38 having a bridge portion 40 interconnecting the arms 36. The frame structure 38 is merely shown diagrammatically, as its construction would vary with the particular installation in which the motor 10 is used. Secured as by setscrews 42 to the valve sleeves 26 and 28 outside the end plates 14 and 16 of the casing 12 are hubs 44 to which are welded or otherwise secured the inner ends of rods 46, the outer ends of which pass through longitudinally elongated slots 48 in the opposite ends of a swinging valve-operating bar 50. Secured to the enlarged central portion 52 of the swinging valve-operating bar 50, as by welding, is the lower end of a valve-operating shaft 54 to which are pinned a collar 56 below the bridge portion 40 and the hub of an operating knob 58 (FIG. 1).

As a consequence, rotation of the knob 58 swings the valve-operating bar 50 in either of two directions to swing the rods 46, hubs 44 and valve sleeves 26 and 28 by equal amounts in opposite directions. The foregoing construction of the elements 44 to 58 inclusive is exemplary of one form of mechanism for rotating the valve sleeves 18 and 20 in opposite directions and it will be apparent to those skilled in this art that other means and mechanism for so rotating the valve sleeves 26 and 28 may be employed—for example, by gears keyed to the hubs 44 and 48 in mesh with pinions on the outer ends of two coaxial shafts replacing the swinging bar 50, the inner ends carrying bevel pinions meshing with a bevel pinion between them mounted on the rotary vertical shaft 54. Rotation of the latter would then cause the two bevel pinions and their associated shafts and spur pinions to rotate in opposite directions, correspondingly rotating the spur gears meshing therewith and keyed to the hubs 44 and 48.

As explained in more detail hereinafter, the hollow fluid inlet and outlet shafts 22 and 24 at their inner ends are internally splined to mesh with the outer ends of double-headed externally splined drive links 60 and 62 respectively which at their inner ends are splined to the externally toothed internally splined inner stator 64 which meshes with the internally toothed rotor 66 of a central orbital gear rotor unit, generally designated 68. The inner ends of the drive links 60 and 62 are held in spaced relationship to one another by a spacer disc or button 70. The construction of the motor 10 is the same on opposite sides of the rotor unit 68 except that the parts on opposite sides of the gear rotor unit 68 face in opposite directions toward the unit 68 and are out of phase with one another, as explained below. A single description of the opposite end portions of the motor 10 will therefore suffice.

Figure 3:
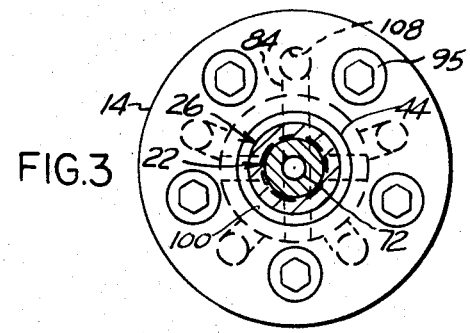
Figure 4:
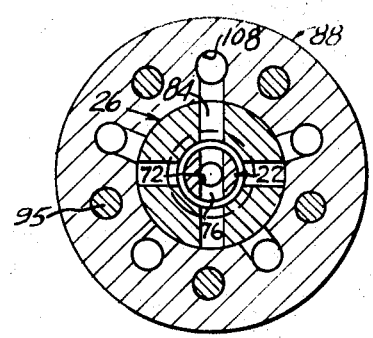
Figure 5:
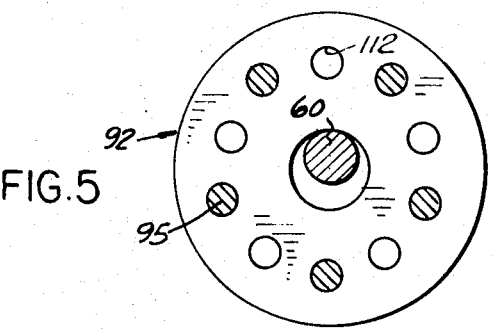
Figure 6:
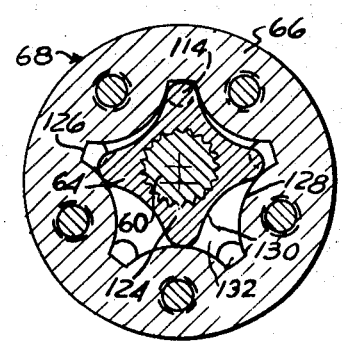

The fluid inlet and outlet shafts 22 and 24 are provided with longitudinally extending axial fluid inlet and outlet passageways 72 and 74 respectively which at their inner ends communicate with diametral or transverse fluid inlet and outlet ports 76 and 78 respectively. The transverse passageways 76 and 78 open into counterbore 80 and 82 in the enlarged inner heads 27 and 29 of the valve sleeves 26 and 28, forming continuations of their bores 83 and 85 which receive the shafts 22 and 24. The counterbores 80 and 82 in turn open into cruciform radial or transverse fluid passageways 84 and 86 respectively (FIGS. 1, 4 and 7). With the motor 10 in its neutral or inoperative condition shown in FIGS. 1 and 3 to 6 inclusive, the transverse fluid passageways 86 of the outlet valve sleeve 28 are in phase with (i.e. aligned with) the corresponding transverse fluid passageways 84 of the inlet valve sleeve 26, whereas in the operating condition of the motor 10, these passageways 86 and 84 are rotated out of phase with one another (FIGS. 7 and 8) by rotating the inlet and outlet valve sleeves 26 and 28 in opposite directions away from one another by the knob 58.

Disposed between the inlet and outlet end plates 14 and 16 and the central gear rotor motor unit 68 are hollow cylindrical fluid inlet and outlet barrels 88 and 90 and inlet and outlet port discs 92 and 94 respectively, all of these elements being bored in alignment to receive tie bolts 95 and 96 (FIG. 1) threaded into the internally threaded bores 98 in the internally toothed outer rotor 66 of the gear rotor motor unit 68. The shafts 22 and 24 and the valve sleeves 26 and 28 are provided with conventional sealing rings or gaskets 100 for preventing leakage of fluid therealong, and both the shafts 22 and 24 and the valve sleeves 26 and 28 are provided with inner and outer thrust bearings 102 and 104 respectively, the latter engaging thrust rings 106 seated in the end plates 14 and 16.

The radial or transverse inlet and outlet passageways 84 and 86 of the inlet and outlet valve sleeves 26 and 28 communicate one at a time (FIGS. 4 and 7) with the outer end of one each of five pairs of circumferentially spaced longitudinal fluid inlet and outlet passageways 108 and 110 respectively (FIGS. 1, 4 and 7). The inner ends of the passageways 108 and 110 communicate with correspondingly aligned ports 112 and 114 (FIGS. 1 and 5) in the inlet and outlet port discs 92 and 94 which are bored centrally for the passage of the drive links 60 and 62.

The enlarged inner ends 23 and 25 of the fluid inlet and outlet shafts 22 and 24 are bored and internally splined as at 116 (FIG. 1) to receive the externally splined outer end portions 118 of the drive links 60 and 62 which at their enlarged externally splined inner ends 120 mesh with an internally splined bore 122 extending through the externally toothed inner stator 64 to hold the latter against rotation while permitting oscillation thereof as its external teeth 124 (FIG. 6) mesh with the internal teeth of pockets 126 in the rotating internally toothed outer rotor 66. The outer rotor 66 has arcuate inwardly projecting lobes 128 between the pockets 126, which, with the external teeth 124 and valleys or roots 130 thereof form chambers 132 therebetween. It will be understood, of course, that the externally toothed stator 64 always possesses at least one less tooth 124 than the internally toothed rotor 66.

In may copending application, Ser. No. 822,376 filed May 7, 1969, for "Rotary Casing Orbital Gear Rotor Motor," I have disclosed and claimed a hydraulic motor having a construction somewhat similar to the present motor but distinguished from the latter by lacking the valve sleeves 26 and 28 rotatable independently of the stationary inlet and outlet shafts 22 and 24. As a consequence, my above-identified former motor rotates in one direction only at a constant speed for a given volume delivery of hydraulic pressure fluid, hence is irreversible, whereas the present motor rotates at variable speeds for the same volume delivery of hydraulic pressure fluid in either of two directions of rotation, according to the settings of the two valve sleeves 26 and 28, hence is reversible. As in my above-identified former motor, it will be evident that the casing 12 of my present motor 10 may optionally be held stationary while the fluid inlet and outlet shafts 22 and 24 are caused to rotate by supplying pressure fluid to the inlet passageway 72 and discharging fluid from the outlet passageway 74. It will also be evident that my motor 10 may likewise be used as a pump by driving the casing 12 while holding the shafts 22 and 24 stationary or vice versa, whereupon hydraulic fluid will be drawn into one of the longitudinal shaft passageways 72 or 74 and pressure fluid discharged through the other passageway 74 or 72, depending upon the direction of rotation imparted thereto. The pump thus provided operates as a reversible variable delivery pump depending upon the setting of the valve sleeves 26 and 28 respectively relatively to their neutral positions.

In the operation of the invention as a motor, hydraulic pressure fluid from a suitable source, such as a hydraulic pump (not shown) is supplied to the longitudinal fluid passageway 72 in the fluid inlet shaft 22 and flows through the radial inlet passageway 76 and thence through one of the radial passageways 84 which happens to be aligned with one of the longitudinal inlet passageways 108 of the inlet barrel 88, whence it flows through the inlet port disc 112 aligned therewith into the therewith aligned pocket 126 of the outer internally toothed rotor 66. If the inlet and outlet valve sleeves 26 and 28 are in their aligned neutral positions shown in FIG. 1, the hydraulic pressure fluid flows directly through the aligned chamber 130 and out through the momentarily aligned longitudinal passageway 110 in the outlet barrel 90, whence it flows through the aligned radial passageway 86 into the annular chamber formed by the counterbore 82 and thence through the transverse passageway 78 and longitudinal passageway 74 of the outlet shaft 24 to the fluid reservoir. With this neutral setting of the valve sleeves 26 and 28, no thrust is exerted against the internally toothed outer rotor 66 and consequently no rotation of the composite outer rotary casing 12 occurs.

If, now, the operator rotates the control knob 58 to rotate the valve sleeves 26 and 28 in opposite directions, the ports 84 and 86 thereof no longer are in direct alignment with their respective longitudinal barrel passageways 108 and 110, port disc passageways 112 and 114 and chamber 132 but move into alignment with different ones. As a consequence, hydraulic pressure fluid enters one of the chambers 132 through the passageways 76, 80, 108 and 112 and is momentarily trapped therein with the result that it acts in its respective pocket 126 of the internally toothed outer rotor 66 against the tooth sidewall thereof, imparting rotation to the rotor 66 until its rotation uncovers the next open outlet port 114 in the outlet disc 94, whereupon it flows through the outlet passageways 110, 86, 78 and 74 respectively of the outlet barrel 90, outlet valve sleeve 28 and outlet shaft 24. The more the knob 58 is rotated to swing the rods 46 still farther apart and consequently to rotate the valve sleeves 26 and 28 farther apart from one another, the greater will be the flow of pressure fluid into the chambers 130 of the orbital gear rotor unit 68 and the less will be the oil diverted to the outlet ports 114 and outlet passageways 110, 86 and 74 and the greater will be the speed of rotation of the outer rotor 66 and consequently that of the composite rotary casing 12. The maximum amount by which the valve sleeves may be moved apart is dependent upon the design of the particular motor, it being 22½° in the example disclosed herein.

While the foregoing actions are taking place, the inner stator 64 is held against rotation by its drive links 60 and 62 through their splined connections to their respective stationary inlet and outlet shafts 22 and 24, yet is permitted to oscillate as it remains in rolling contact while meshing with the internally toothed outer rotor 66. Thus, the farther the inlet and outlet valve sleeves 26 and 38 are rotated away from one another, the higher is the speed acquired by the outer rotor 66 and transmitted to the barrels 88 and 90, port discs 92 and 94 and end plates 14 and 16 bolted thereto.

If, on the other hand, the operator desires to reverse the direction of rotation of the rotary casing 90, he rotates the control knob 58 in the opposite direction, whereupon the pressure fluid reaching the chambers 130 is forced to travel in the opposite direction of rotation before it can escape through an outlet port 114 and the passageways 110, 86, 78 and 74 communicating therewith. Accordingly, the thrust against the internally toothed outer rotor 66 occurs in the opposite direction, thus reversing the direction of rotation of the outer rotor 66 and with it the direction of rotation of the composite outer rotary casing 12. Here, again, and for the same reasons set forth above, the farther apart the valve sleeves 26 and 28 are rotated in the reverse direction, the more rapid becomes the rotation of the internally toothed outer rotor 66 for a given volume of delivery of pressure fluid, and consequently the greater the speed of rotation of the composite outer rotary casing 90.

Although it is preferable to employ two externally toothed double-headed externally splined drive links 60 and 62 because of the greater strength and durability imparted to the motor 10, it will be apparent to those skilled in this art that either one of the drive links 60 and 62 could be omitted because the fluid inlet and outlet shafts 22 and 24 are held firmly against rotation by reason of their keyed connections to one another 30, 32 through the arms 36 and bridge portion 40 of the supporting frame structure 38. The rotary casing consisting of the internally toothed outer rotor and the input and output barrels and end plates bolted thereto become a reversible, variable speed drive pulley capable of driving a belt, gear, sprocket or cam at variable speeds for a given volume of delivery of hydraulic fluid from the pump or other source of hydraulic pressure fluid.

I claim:

1. A reversible, variable speed, orbital gear rotor motor, comprising
   an internally toothed outer member encircling a working chamber,
   an externally toothed inner member having a lesser number of teeth than said internally toothed outer member and disposed eccentrically thereto in meshing engagement therewith inside said chamber,
   a pair of fluid inlet and outlet flow-transmitting elements connected unitarily to opposite ends of said internally toothed outer member and having circumferentially spaced longitudinal fluid passageways therein communicating with the periphery of said chamber between the teeth of said internally toothed outer member,
   hollow fluid inlet and outlet shafts disposed respectively within said fluid inlet and outlet flow-transmitting elements in inwardly spaced relationship therewith and having fluid inlet and outlet passageways therein adapted to be connected respectively to pressure fluid supply and discharge means,
   a pair of rotatable fluid inlet and outlet flow-controlling valve members interposed between said shafts and said flow-transmitting elements and having fluid-distributing passageways therein selectively rotatable into positions connecting said inlet shaft passageway with one of said fluid inlet flow-transmitting element passageways while connecting said outlet shaft passageway with one of said fluid outlet flow-transmittting element passageways, means interconnecting said externally toothed inner member and said shafts for preventing relative rotation therebetween while permitting oscillation of said externally toothed inner member relatively to said shafts, and means for adjustably rotating said flow-controlling valve members relatively to one another.

2. An orbital gear rotor motor, according to claim 1, wherein said last-mentioned means includes mechanism operatively interconnecting said flow-controlling valve members for rotation simultaneously in opposite directions relatively to one another.

3. An orbital gear rotor motor, according to claim 1, wherein said valve members comprise sleeves rotatably mounted on said shafts, and wherein said sleeves and said shafts have portions of their respective passageways disposed transversely thereto and communicable with one another upon relative rotation therebetween.

4. An orbital gear rotor motor, according to claim 3, wherein said flow-transmitting elements comprise hollow barrels with their respective fluid passageways communicable at their outer ends with the transverse passageway portions of said sleeves.

5. An orbital gear rotor motor, according to claim 3, wherein said sleeves have enlarged heads on the inner ends thereof containing said fluid-distributing passageways thereof.

6. An orbital gear rotor motor, according to claim 5, wherein said shafts also have enlarged heads on the inner ends thereof disposed in proximity to said sleeve heads, and wherein said interconnecting means between said externally toothed inner member and said shafts operatively engages said shaft heads.

7. An orbital gear rotor motor, according to claim 3, wherein said transverse portions of said shaft passageways comprise single diametral passageways and wherein transverse portions of said sleeve passageways comprise radial passageways.

8. An orbital gear rotor motor, according to claim 1, wherein inlet and outlet port members are disposed respectively between the opposite ends of said internally toothed outer member and said inlet and outlet flow-transmitting elements and have ports therethrough extending between the inner ends of said flow-transmitting element passageways and said internally toothed outer member.

9. A reversible, variable speed, orbital gear rotor motor, comprising an internally toothed outer member encircling a working chamber, an externally toothed inner member having a lesser number of teeth than said internally toothed outer member and disposed eccentrically thereto in meshing engagement therewith inside said chamber, a pair of fluid inlet and outlet flow-transmitting elements connected unitarily to opposite ends of said internally toothed outer member and having circumferentially spaced longitudinal fluid passageways therein communicating with the periphery of said chamber between the teeth of said internally toothed outer member, hollow fluid inlet and outlet shafts disposed respectively within said fluid inlet and outlet flow-transmitting elements in inwardly spaced relationship therewith and having fluid inlet and outlet passageways therein adapted to be connected respectively to pressure fluid supply and discharge means, a pair of rotatable fluid inlet and outlet flow-controlling valve members interposed between said shafts and said flow-transmitting elements and having fluid-distributing passageways therein selectively rotatable into positions connecting said inlet shaft passageways with one of said fluid inlet flow-transmitting element passageways while connecting said outlet shaft passageway with one of said fluid outlet flow-transmitting element passageways, means interconnecting said externally toothed inner member and said shafts for preventing relative rotation therebetween while permitting oscillation of said externally toothed inner member relatively to said shafts, means for adjustably rotating said flow-controlling valve members relatively to one another, inlet and outlet end members disposed outwardly of said inlet and outlet flow-transmitting elements, and means for unitarily interconnecting said end members, said flow-transmitting elements and said internally toothed outer member and collectively forming a casing structure thereof.

10. An orbital gear rotor motor, according to claim 9, wherein said flow-controlling elements have portions projecting externally of said casing structure, and wherein said adjustably rotating means are operatively connected to said projecting portions.